United States Patent [19]

Brining

[11] 3,774,351

[45] Nov. 27, 1973

[54] FEEDING APPARATUS

[75] Inventor: Douglas E. Brining, Southfield, Mich.

[73] Assignee: Feedmatic-Detroit, Inc., Southfield, Mich.

[22] Filed: Feb. 28, 1972

[21] Appl. No.: 229,797

[52] U.S. Cl................. 51/215 H, 51/82, 51/88, 221/234
[51] Int. Cl............................................. B24b 47/20
[58] Field of Search............... 51/215 R, 215 H, 51/82 R, 88, 103 WH; 214/1 BB, 1 R; 221/234, 224, 268, 243

[56] References Cited
UNITED STATES PATENTS

| | | | |
|---|---|---|---|
| 2,589,616 | 3/1952 | Kitterman | 51/82 R |
| 2,752,733 | 7/1956 | Peden | 51/215 H X |
| 2,814,919 | 12/1957 | Jones et al. | 51/103 WH X |

Primary Examiner—Donald G. Kelly
Assistant Examiner—Howard N. Goldberg
Attorney—Donald P. Bush

[57] ABSTRACT

A universally adjustable attachment for sequentially feeding small parts to a machine such as a grinder including a flexible air tube through which parts are advanced to approximate loading position, and adjustable structure for placing the part in the machine.

14 Claims, 7 Drawing Figures

Patented Nov. 27, 1973

FEEDING APPARATUS

BRIEF SUMMARY OF THE INVENTION

The present apparatus is designed to select and orient a sequence of small parts such for example as elongated parts of circular cross-section having heads or intermediate flanges. The parts are arranged in a continuous series and upon each operation of the feeding apparatus the foremost part is advanced from the array and is caused to drop into a flexible tube interconnecting the parts selecting and orienting device with a loading device and placing the part in a machine tool such for example as a centerless grinder.

Air is admitted into the flexible tube causing the part therein to be advanced into the loading attachment for displacement into the grinder.

The loading attachment is universally adjustable so as to permit exactly correct location thereof with respect to the particular machine tool with which it is associated. This adjustment provides for vertical movement and horizontal movement in paths at right angles to each other, as well as angular adjustment about a horizontal axis.

Loading of the part into the machine tool is accomplished by advancing a plunger which mechanically engages the part and pushes it out of the loading attachment into proper registration with the machine tool.

DETAILED DESCRIPTION

Figure 1:
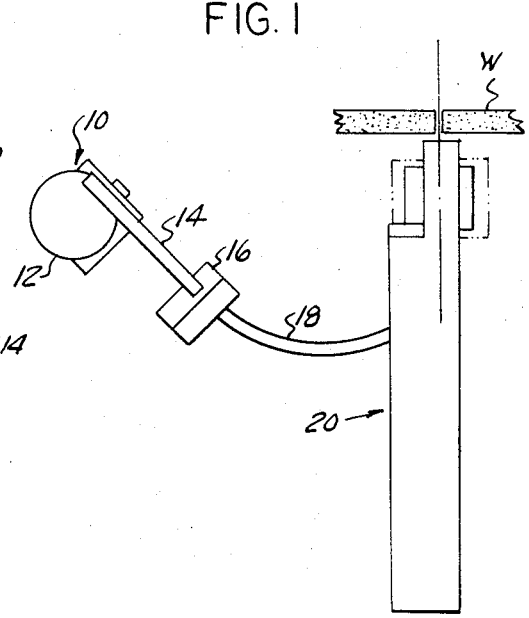
FIG. 1 is a diagrammatic view showing the relationship of components of the system.

Referring first to FIG. 1, the feeding apparatus is illustrated as associated with a centerless grinder, only the grinding wheels W of which are illustrated. The apparatus comprises a vibration type part sorting and advancing unit 10 which comprises a bowl 12 for receiving a multiplicity of parts in random orientation, a trackway along which the parts are advanced in oriented relationship by vibration out of the bowl 12 and onto an inclined track 14 by means of which the parts are advanced to a device 16 for separating the foremost part and advancing it through a flexible tube 18 to loader mechanism indicated generally at 20.

Figure 2:
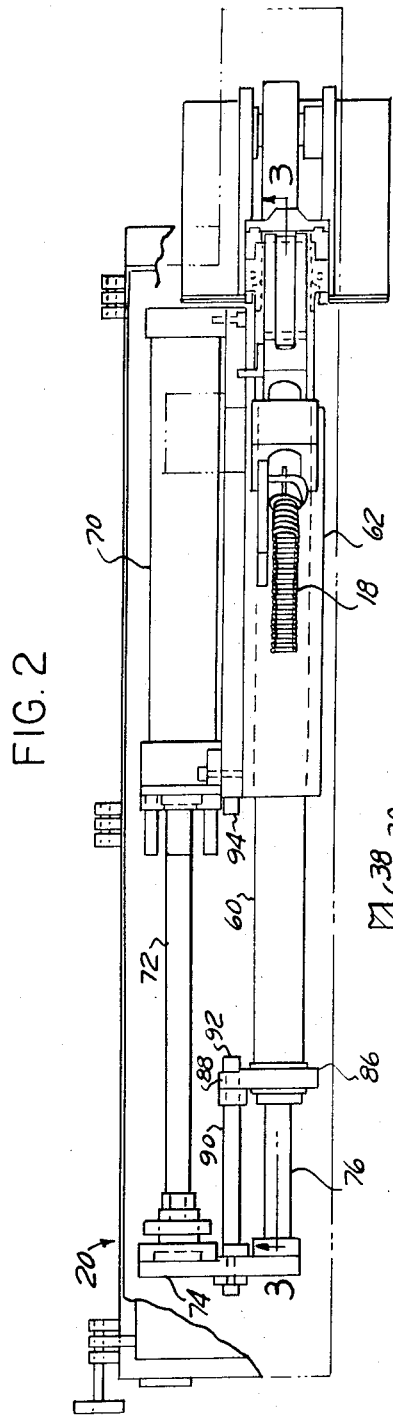
FIG. 2 is an approximate plan view of the loader.
Figure 4:
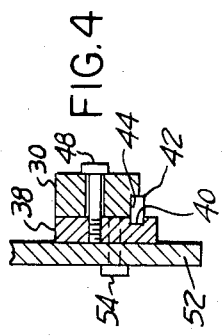
FIG. 4 is a fragmentary sectional view on the line 4—4, FIG. 3.
Figure 3:
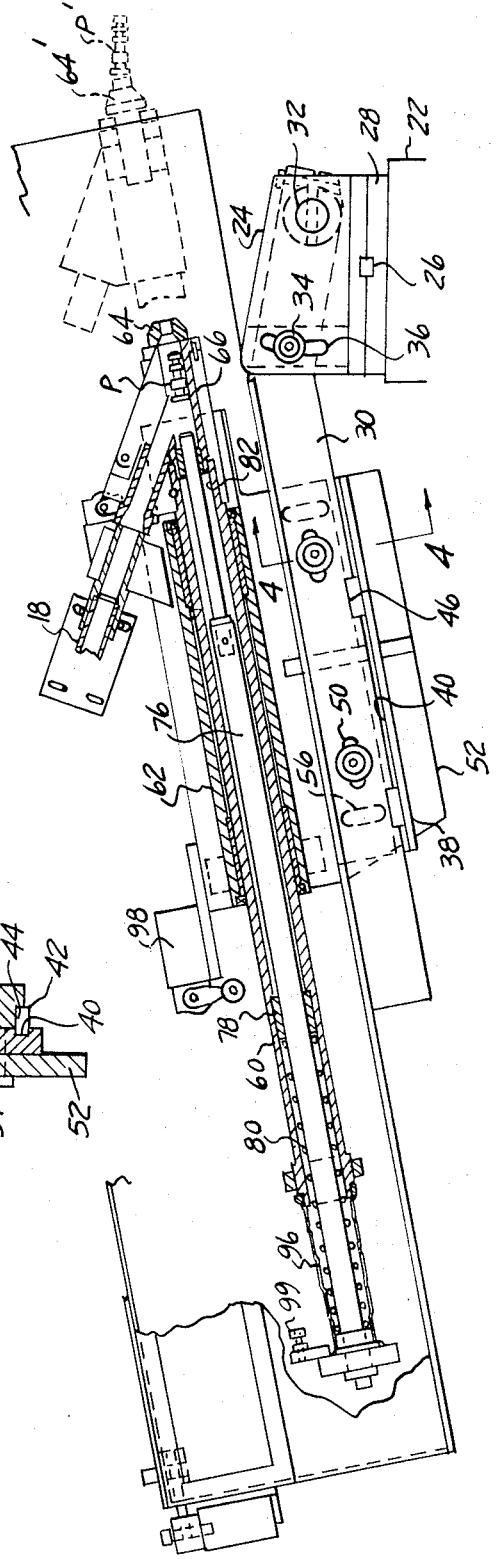
FIG. 3 is a fragmentary section through the loader taken substantially on the line 3—3, FIG. 2.

Referring to FIGS. 2–4, the loader mechanism 20 is adapted to be positioned adjacent the machine tool by a suitable stationary support structure a portion of which is indicated at 22. Mounted on the support structure 22 for horizontal adjustment thereon is a bracket 24 guided for transverse adjustment by suitable means such as the key 26 interposed between the base of the bracket 24 and a cooperating plate 28 on the support 22. A feeder support arm 30 is pivoted to bracket 24 as indicated at 32 and may be clamped in adjusted position by a clamping screw 34 carried thereby and movable through an arcuate slot 36 in the bracket.

Connected to the arm 30 for longitudinal adjustment thereon is an intermediate elongated plate 38 having an elongated groove 40 therein as best seen in FIG. 4, for the reception of a guiding key 42. The arm 30 is provided with a recess 44 adjacent the groove 40 so that the key 42 is retained in position. In addition, the arm 30 is provided with spaced recesses 46 adapted to receive lugs on the key 42 to retain it in position. Screws 48 are threaded in openings in the intermediate plate 38 and extend through elongated recesses or slots 50 provided in the arm 30.

The loader includes a vertically depending plate 52 which is connected to the intermediate plate 38 for adjustment thereto in a direction perpendicular to the adjustment afforded by the elongated slots 50. For this purpose the clamping screws 54 are engaged in threaded recesses in the elongated plate 38 and extend through elongated slots 56 provided in the plate 52.

From the construction just described it will be observed that the loader unit is mounted for horizontal movement longitudinally of the key 26, for angular adjustment about the axis of pivot 32, for longitudinal adjustment parallel to the elongated slots 50, and for generally vertical adjustment in the direction of the elongated slots 56. With this arrangement the loader may be brought into position adjacent the machine tool such as the centerless grinder, and may be adjusted so that upon actuation thereof, the part is deposited in working position in the grinder.

The loader essentially comprises an elongated tubular member 60 slidable in a sleeve 62 carried by the mounting plate 52. At the forward end of the tubular member 60 there is provided a part locating nozzle 64 and a part supporting chamber member 66 into which a part P is advanced by air pressure through a flexible tube as will subsequently be described. The nozzle 64 may be suitable formed to restrain forward movement of the part until it is positively advanced through the nozzle by mechanism which will presently be described.

Supported on the loader parallel to the guide sleeve 62 is an operating cylinder 70 having a piston therein connected to a piston rod 72 connected by a transverse bracket 74 to a plunger 76. The plunger 76 is slidable longitudinally of the tubular loading member 60 and is guided therein by a bushing 78 which also constitutes a spring seat for the compression spring diagrammatically indicated at 80.

The forward end of the plunger 76 is provided with an elongated cylindrical feed rod 82 which is adapted to move forwardly in the tubular member 60 and to engage the rearward end of the part P and to expel the part through the nozzle 64 into proper position as indicated at P' on the centerless grinder.

In order to provide for advancing the part into position adjacent the grinder and for thereafter moving the part into proper working position, the tubular member 60 adjacent its rear end is provided with a collar 86 having a projecting ear 88 receiving the threaded end of a guide rod 90 which at its forward end carries a bumper element 92. A similar bumper element 94 is provided on the stationary feeder structure so that upon actuation of the cylinder 70 causing the piston therein to move to the right, the plunger 76 is moved by the bracket 74 to the right and this motion is transmitted to the tubular member 60 by the spring 80 which advances the tubular member to the dotted line position in which the nozzle is located as indicated at 64'. When forward movement of the tubular member 60 is arrested the piston rod 72 continues to move the plunger 76 forwardly, further compressing the spring 80 and causing the feed rod 82 to expel the part P from the loader onto the machine tool.

Preferably, a telescoping housing 96, which may be formed as a spiral spring, interconnects the rear end of the tubular member 60 and the rear end of the plunger 76, housing the spring 80 therein.

After the part P has been loaded into the machine, fluid is reversed in the cylinder 70, as for example by operation of a limit switch 98 by an actuator 99, returning the parts to the position best illustrated in FIG. 3, thus withdrawing the loader and particularly, the nozzle 64 from its forward position in which it would interfere with the normal operation of the grinder.

Means subsequently to be described are actuated upon each operation of the loader to advance a part P through the flexible tube 18 from the part feeder subsequently to be described. However, at this point it may be noted that the flexible tube 18 is preferably in the form of a coil spring having a flexible thin air-tight plastic coating. This tube may be produced by compressing the spring into closed relation in which adjacent convolutions are in abutment, and dipping the spring to provide the thin flexible plastic coating thereon. The spring may of course be formed of a hard steel capable of withstanding the movement therethrough of a multiplicity of parts without undue wear.

Figure 6:
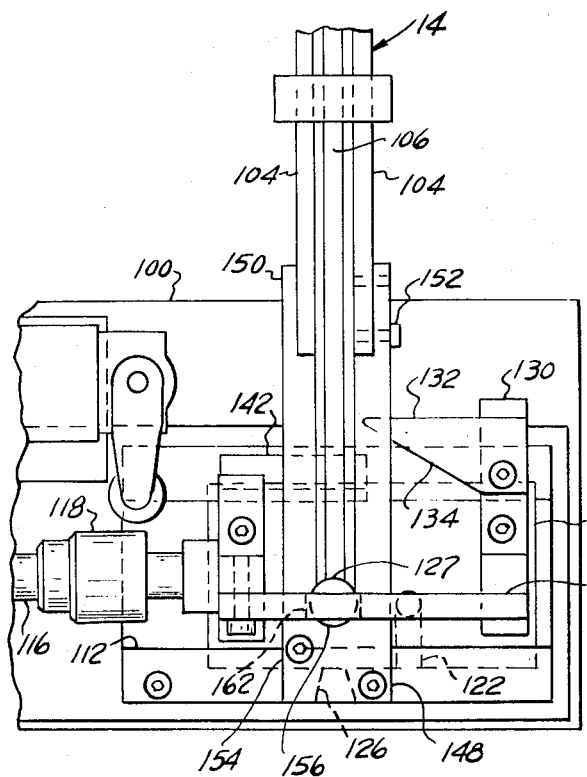
FIG. 6 is a plan view of the portion of the part feeder seen in FIG. 5.
Figure 7:
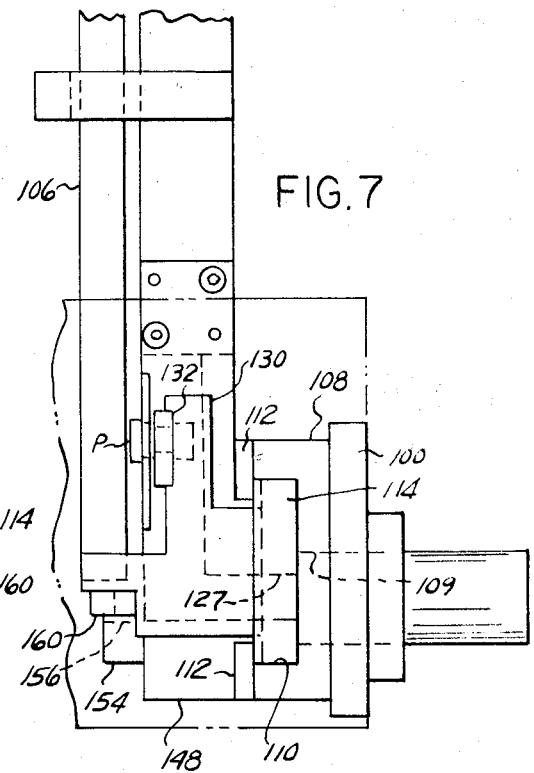
FIG. 7 is a side elevational view of the part feeder seen from the right in FIG. 6.
Figure 5:
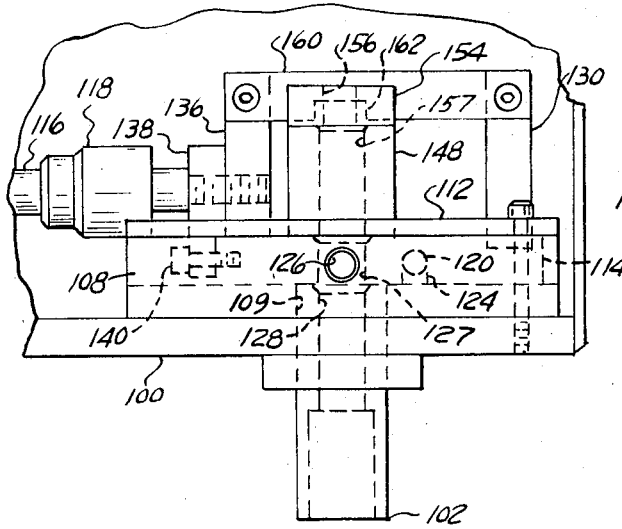
FIG. 5 is a fragmentary elevational view of the part feeder.

Referring now to FIGS. 5, 6 and 7, the part feeding unit shown at 16 in FIG. 1 is illustrated in detail. The construction comprises a fixed support plate 100 having a connector 102 to which the flexible tube 18 is attached. The track 14 interconnecting the feeding bowl 12 and the feed unit 16 comprises a pair of laterally spaced rails 104 and an intermediate rail 106 which overlies the space between the rails 104. The rails are appropriately positioned in accordance with the dimensions of the part which is to be advanced and the intermediate rail 106 retains the parts against vertical movement off of the support rails 104. Fixedly mounted on the plate 100 is a slide block 108 having an opening 109 therethrough receiving the upper end of connector 102 and having a transversely extending recess 110 best seen in FIG. 7, and partially overlaid by removable cover members 112 which are adapted to retain a slide 114 therein for movement longitudinally of the recess 110 by suitable actuating means such as a piston rod 116 connected to the slide 114 by a coupler 118.

The slide 114 serves among its other functions as a valve and for this purpose is provided with a port 120 opening at one edge of the slide into a transversely extending passage 122 which in turn is connected to a downwardly extending passage 124 which is adapted to supply air into the upper end of the fitting or connector 102, as will subsequently be described.

Cooperating with the valve means constituted by the port 120 and the passages 122, 124 is an air inlet comprising a tapered threaded opening 126 provided in the side of the slide block 108. With the parts in the position illustrated in FIG. 5, the valve structure 120, 122, 124 is out of alignment with the air inlet port constituted by the opening 126, and accordingly, air is cut off from the flexible tube 18.

The slide 114 is also provided with a vertically extending opening 127 which is moved by movement of the slide 114 either into or out of registration with opening 128 in the connector 102.

When the slide 114 moves to the left as seen in FIG. 5, until the port 120 is in registration with the opening 126, air under suitable pressure is admitted into the upper end of the connector 102.

Carried by the slide 114 is a block 130 which carries a finger 132 having an inclined part feeding surface 134. A second block 136 is carried at the opposite end of the slide 114 by means of a bracket 138 formed integrally with the block 136 and bolted or otherwise secured to the end of the slide 114 as indicated at 140. The bracket 138 is connected to the coupler 118 so that upon operation of a fluid actuated cylinder (not shown) the slide 114 and associated mechanism is reciprocated horizontally or from right to left as viewed in FIGS. 5 and 6.

A stop finger 142 is carried by the block 136 and works in conjunction with the finger 132 to advance parts one at a time for movement to the loader 20. With the parts in the position illustrated in FIG. 5 the finger 132 is retracted from the path of advance of parts P and the foremost part of an assembly advancing along the rails 104 is in engagement with the stop 142. As the slide 114 is moved to the left by the piston rod 116, the pointed end of the finger 132 enters into the space between the foremost part and the next adjacent part as the stop finger 142 is retracted. When the stop finger 142 moves out of the path of advance of the part, the inclined feeding surface of the finger 132 advances the part toward the opening into the flexible tube 18.

Mounted in fixed position on the slide block 108 is a stationary block 148 having a through opening 157 and which includes rearwardly extending arms 150 to which the forward ends of rails 104 are connected by suitable means such as the bolts indicated at 152. Suitably secured to the top of the block 148 is a stop 154 the rearward edge of which is recessed as indicated at 156 for the reception of the head or properly dimensioned flange of a work part P.

Extending across and interconnecting the front top portions of the blocks 130 and 136 is a guide strip 160 having in its lower edge a notch 162 dimensioned to permit passage therethrough of the head or corresponding portion of the work part P. The stop 154 carried at the top of the block 148 has the arcuate recess 156 in its front face in position to receive the head or corresponding portion of the work part P when the slide 114 is to the right as seen in FIGS. 5 and 6. Accordingly, at this time a part which has been advanced by the inclined surface 134 of the finger 132 is permitted to move by gravity into vertical alignment with the openings 157, 127, and 128, and to drop by gravity down through the connection 102 into the flexible tube 18. This part will move down to the bottom of the curved portion of the flexible tube where it will remain until the slide 114 is next moved to the left as seen in FIGS. 5 and 6.

Upon movement of the slide 114 to the left, the vertical opening 127 through the slide moves out of alignment with the exit passage for the part and upon completion of its movement to the left the valve means constituted by the passages 122 and 124 are connected by the port 120 to the inlet opening 126 and air under suitable pressure is admitted into the tube, thus moving the part through the tube and into the position illustrated in full lines in FIG. 3. The part which has been advanced by the finger 132 engages the guide strip 160 at a point spaced from the notch 162 therein and accordingly, the part is not permitted to advance into alignment with the exit opening. When however, the slide 114 moves to the position illustrated in FIGS. 5 and 6, the notch 162 in the strip 160 permits the part to move into the recess 156 in stop 154 and at this time the part drops by gravity and falls into the flexible tube pending the next admission of a charge of compressed air to advance the part to the loader.

In general terms it will be observed that the feeding apparatus orients various parts into feeding position where the parts are advanced one at a time into the flexible tube leading to the loader. In timed relation to operation of the feeding apparatus, the loader is operated to receive a work part and to shift the loader into operative position with respect to the grinder, after which the part is ejected from the loader directly into working position on the grinder.

Since the loader is provided with universal adjustability it may be associated with grinders or other machine tools occupying slightly different positions and brought into conformity therewith. This adjustment is permitted in part by the flexible part feeding tube without requiring adjustment of the feeding apparatus.

Also, the part loader is characterized by the fact that the mechanism thereon which actually deposits the part on the machine tool has a substantial movement as for example, 8 or 10 inches into and out of loading position so that after loading, the part which actually deposits the work part on the machine is withdrawn to a position where it will not interfere with operation of the machine tool nor be adversely affected by coolant, dust, or the like.

What I claim as my invention is:

1. Part feeding and loading equipment for a machine tool comprising a feeder including means for orienting and advancing work parts in sequence toward a machine tool, a loader arranged to receive individual parts from the feeder and to deposit them in position to be operated on by the machine tool, and means for adjusting the position of the loader independently of said feeder to conform to the position of the machine tool, the means for adjusting said loader comprising pivot means for adjusting the orientation thereof and means for effecting universal adjustment of the location thereof, the means for effecting universal adjustment of the location of the loader comprising means for adjusting the loader substantially horizontally in a first direction, separate means for adjusting the loader substantially horizontally in a direction substantially at right angles to said first direction, and separate means for adjusting said loader substantially vertically.

2. Equipment as defined in claim 1 comprising in addition a flexible conduit connecting said feeder and loader.

3. Equipment as defined in claim 2 in which said loader comprises a guide, a loading member movable on said guide toward and away from the working position of a work part on the machine tool, said conduit being connected to said loading member.

4. Part feeding and locating equipment for a machine tool comprising a feeder including means for orienting and advancing work parts in sequence toward a machine tool, a loader arranged to receive individual parts from the feeder and to deposit them in position to be operated on by the machine tool, and means for adjusting the position of the loader independently of said feeder to conform to the position of the machine tool, said loader comprising a guide, a loading member movable on said guide toward and away from the machine tool, and means operable when said loading member is adjacent the machine tool for displacing a work part from the loader onto the machine tool.

5. Equipment as defined in claim 4, said last recited means comprising a chamber at the portion of said loading member adjacent the tool, a nozzle, a plunger connected to said loading member for movement with said loading member, and movable relative to said loading member when said loading member is adjacent the machine tool to eject a work part from said chamber through said nozzle into working position.

6. Equipment as defined in claim 5 which comprises spring means connecting said plunger and loading member, and actuating means connected directly to said plunger to move said loading member toward the machine tool upon movement of said plunger through said spring means.

7. A loader for a machine tool comprising a guide, a loading member movable on said guide toward and away from the machine tool, a chamber at the portion of said loading member adjacent the tool, a nozzle, a plunger connected to said loading member for movement with said loading member, and movable relative to said loading member when said loading member is adjacent the machine tool to eject a work part from said chamber through said nozzle into working position.

8. A loader as defined in claim 7 which comprises spring means connecting said plunger and loading member, and actuating means connected directly to said plunger to move said loading member toward the machine tool upon movement of said plunger through said spring means.

9. Part feeding and locating equipment for a machine tool comprising a feeder including means for orienting and advancing work parts in sequence toward a machine tool, a loader arranged to receive individual parts from the feeder and to deposit them in position to be operated on by the machine tool, a flexible tube connecting said feeder and loader, said feeder comprising means for separating the foremost one of an array of work parts positioned at said feeder and for dropping it into the upwardly open end of said tube, additional means for thereafter admitting a charge of compressed air into said tube in rear of the work part received therein to advance the work part therein to said loader, and means for adjusting the position of the loader independently of said feed to conform to the position of the machine tool.

10. Equipment as defined in claim 9 in which the additional means recited therein comprises a slide, valving means controlled by movement of said slide to admit air to said tube, and abutment means movable with said slide to permit or prevent movement of a work part into said tube.

11. Equipment as defined in claim 10 in which said valving means comprises air passage means formed in said slide.

12. Part feeding and loading equipment for a machine tool comprising a feeder including means for orienting and advancing a series of work parts in oriented relation, a flexible tube connected at one end to said feeder, means associated with said feeder for separating the foremost of said parts from said series and advancing said foremost part into said tube, a loader connected to the other end of said tube, said loader comprising means for receiving individual work parts from said tube and for depositing them in position to be operated on by the machine tool, means for advancing individual parts through said tube to said loader, and means for adjusting the position of said loader independently of the position of said feeder to conform to the position of the machine tool.

13. Equipment as defined in claim 12 in which the means for advancing individual parts through said tube comprises means operable in timed relation to the means for separting the foremost of said parts from said series and advancing it into said tube.

14. Equipment as defined in claim 13 in which the means for advancing the individual parts through said tube comprises means for admitting a charge of compressed air into said tube in rear of an individual work part therein.

* * * * *